United States Patent
Yun et al.

(10) Patent No.: US 12,096,258 B2
(45) Date of Patent: Sep. 17, 2024

(54) CLASSIFYING RF INTERFERENCE SOURCES USING MACHINE LEARNING AND OPERATIONS, ADMINISTRATION, AND MANAGEMENT DATA

(71) Applicant: Spectrum Effect Inc., Kirkland, WA (US)

(72) Inventors: Jungnam Yun, Kirkland, WA (US); Eamonn Gormley, Kirkland, WA (US); Jesus Alejandro Valdes Valdes, Saltillo (MX)

(73) Assignee: Spectrum Effect Inc., Kirkland, WA (US)

( * ) Notice: Subject to any disclaimer, the term of this patent is extended or adjusted under 35 U.S.C. 154(b) by 356 days.

(21) Appl. No.: 17/545,769

(22) Filed: Dec. 8, 2021

(65) Prior Publication Data
US 2023/0090727 A1   Mar. 23, 2023

Related U.S. Application Data (60) Provisional application No. 63/246,389, filed on Sep. 21, 2021.

(51) Int. Cl.
*H04W 24/08* (2009.01)
*G06N 5/022* (2023.01)
*H04L 41/16* (2022.01)

(52) U.S. Cl.
CPC ............ *H04W 24/08* (2013.01); *G06N 5/022* (2013.01); *H04L 41/16* (2013.01)

(58) Field of Classification Search
CPC ............ G06N 20/00–20; H04L 41/16; H04W 24/00–10; H04W 72/0453
See application file for complete search history.

(56) References Cited

U.S. PATENT DOCUMENTS

| | | | |
|---|---|---|---|
| 9,960,891 B2* | 5/2018 | Li | H04W 72/23 |
| 10,015,089 B1* | 7/2018 | Gonzalez | H04L 41/0631 |
| 10,992,397 B2* | 4/2021 | Singh | H04B 17/345 |
| 11,394,475 B1* | 7/2022 | Vaca | H04W 24/08 |
| 2018/0013670 A1 | 1/2018 | Kapadia et al. | |
| 2019/0188598 A1* | 6/2019 | Ishida | G06F 17/18 |
| 2019/0342202 A1* | 11/2019 | Ryan | H04L 41/142 |
| 2019/0386921 A1 | 12/2019 | Pignataro et al. | |
| 2021/0160719 A1* | 5/2021 | Winter | G06N 3/04 |
| 2021/0250108 A1* | 8/2021 | Nahata | H04L 45/306 |
| 2021/0288731 A1* | 9/2021 | Yun | H04B 17/318 |

(Continued)

OTHER PUBLICATIONS

Lenovo et al. "Discussion on standard impact to support AI functionality", R3-212180, 3GPP TSG-RAN WG3 #112e, Online, Lenovo, Motorola Mobility, May 7, 2021, section 2-3.

(Continued)

*Primary Examiner* — Brendan Y Higa (57) ABSTRACT

A method for classifying sources of interference provides Operations, Administration, and Management (OAM) data available in a wireless communication network to a trained machine learning model that outputs indications of the types of interference sources exhibited in the OAM data. The OAM data provided to the machine learning model may include per-Physical Resource Block (per-PRB) interference data for a cell, and may further include metadata corresponding to the configuration of the cell.

18 Claims, 7 Drawing Sheets

(56) References Cited

U.S. PATENT DOCUMENTS

| | | | |
|---|---|---|---|
| 2022/0167183 A1* | 5/2022 | Eng .................. | H04W 24/10 |
| 2022/0188703 A1* | 6/2022 | Hong ................ | G06N 20/00 |
| 2022/0201694 A1* | 6/2022 | Amer ................ | H04W 24/08 |
| 2023/0088342 A1* | 3/2023 | Winter .............. | H04W 24/04 |

OTHER PUBLICATIONS

Zero-touch network and Service Management (ZSM); Landscape, ETSI GR ZSM 004 V1.1.1 (Mar. 2020), Mar. 2, 2020, pp. 1-70, section 5.8.1.
5G; Architecture enhancements for 5GS to support network data analytics services (3GPP TS 23.288 version 16.8.0 Release 16), ETSI TS 123 288 V16.8.0 (Jul. 2021), Jul. 28, 2021, pp. 1-68, section 4.2.
International Search Report and Written Opinion for related PCT/US2022/044146, mailed Jan. 12, 2023.

\* cited by examiner

FIG. 12

CLASSIFYING RF INTERFERENCE SOURCES USING MACHINE LEARNING AND OPERATIONS, ADMINISTRATION, AND MANAGEMENT DATA

CROSS-REFERENCE TO RELATED APPLICATION

This application claims the benefit of U.S. Provisional Application No. 63/246,389, filed on Sep. 21, 2021, the contents of which are incorporated herein by reference.

BACKGROUND

The wide adoption of mobile devices along with ubiquitous cellular data coverage has resulted in an explosive growth of mobile applications that expect always-accessible wireless networking. This growth has placed demands on network performance including demands for fast and reliable communication paths, which causes increasing strain on the limited radio-frequency (RF) spectrum allocated to wireless telecommunication. Accordingly, efficient use of the limited spectrum is increasingly important to the advancement of wireless communication technology.

Interference is a barrier to efficient use of wireless spectrum. Modern wireless communications operate in interference-limited environments where signal quality to and from network subscriber devices is limited in part by interference from other users served by the same or nearby cells. These networks may be designed and optimized assuming a clear spectrum occupied only by radio frequency transmitting equipment associated with the specific network. However, this ideal of clear spectrum occupied only by intended users of the system is not always achieved.

Real world systems often experience unexpected network interference which may originate from radio frequency (RF) generating sources that are not associated with a licensed wireless network. These potential interference sources include many things such as industrial machinery, electronics test equipment radiating signals in the bands of interest, illegal radio transmitters, and undesired mixing products generated by such sources and/or the licensed system itself, such as passive intermodulation (PIM) interference. The result of these interference sources is degraded system service and reduced wireless network capacity and coverage as the intentional signals suffer capacity and quality losses due to these interferers.

In order to provide the best quality of service (QoS) to customers, it is important for network operators to detect and resolve issues caused by RF interference. In order to correct the RF interference issue, network operators need to know what type of interference source is causing the issue. For example, if the interference is coming from an external source, the interference source should be located and turned off. If the interference is severe co-channel interference from cellular devices, radio parameters at the base station or adjacent base stations should be optimized so that cellular device-based co-channel interference can be reduced. If the interference is passive intermodulation (PIM) interference, replacing connectors or other antenna components may reduce the interference.

With all these different resolutions each corresponding to a different interference source type, accurately classifying interference type becomes a critical task in wireless network management.

TECHNICAL FIELD

Embodiments of the present disclosure relate to a system and method that detects and classifies interference sources in a wireless communication network using network management data. In particular, embodiments may train a machine learning model, use a trained machine learning model, or both to detect and classify interference sources from information in wireless network Operation, Administration, and Management (OAM) data.

BRIEF SUMMARY

This disclosure describes systems and methods related to machine learning (ML) models that use network management data to detect and classify interference. The network management data may include Configuration Management (CM) data, Performance Management (PM) data, and topology data.

In an embodiment, a method for determining a type of a source of interference received in a wireless telecommunications network comprises receiving Operations, Administration, and Management (OAM) data of the wireless telecommunications network, and producing, using the OAM data, first per-Physical Resource Block (per-PRB) interference data for a cell of the wireless telecommunications network. The first per-PRB interference data includes interference data for each of a plurality of PRBs of the cell for each of a plurality of intervals within a period of time. The method further comprises producing, using a trained machine learning (ML) model and based on the first per-PRB interference data, one or more interference source type indications.

In another embodiment, non-transient computer-readable medium (CRM) including computer programming product which, when executed by a user device, cause the user device to perform steps that comprise determining a type of a source of interference received in a wireless telecommunications network comprises receiving Operations, Administration, and Management (OAM) data of the wireless telecommunications network, and producing, using the OAM data, first per-Physical Resource Block (per-PRB) interference data for a cell of the wireless telecommunications network. The first per-PRB interference data includes interference data for each of a plurality of PRBs of the cell for each of a plurality of intervals within a period of time. The steps further comprise producing, using a trained machine learning (ML) model and based on the first per-PRB interference data, one or more interference source type indications.

In embodiments, each of the one or more interference source type indications includes an indication of a type of an interference source and a corresponding confidence level indicating a level of certainty that interference in the first per-PRB interference data was caused by that type of interference source.

In embodiments, the first per-PRB interference data further includes metadata corresponding to equipment of the cell, metadata corresponding to an operating configuration of the cell, or both.

DETAILED DESCRIPTION

A detailed description of embodiments is provided below along with accompanying figures. The scope of this disclosure is limited only by the claims and encompasses numerous alternatives, modifications and equivalents. Although steps of various processes are presented in a particular order, embodiments are not necessarily limited to being performed in the listed order. In some embodiments, certain operations may be performed simultaneously, in an order other than the described order, or not performed at all.

Numerous specific details are set forth in the following description in order to provide a thorough understanding. These details are provided for the purpose of example and embodiments may be practiced according to the claims without some or all of these specific details. For the sake of clarity, technical material that is known in the technical fields related to this disclosure has not been described in detail so that the disclosure is not unnecessarily obscured.

Figure 1:
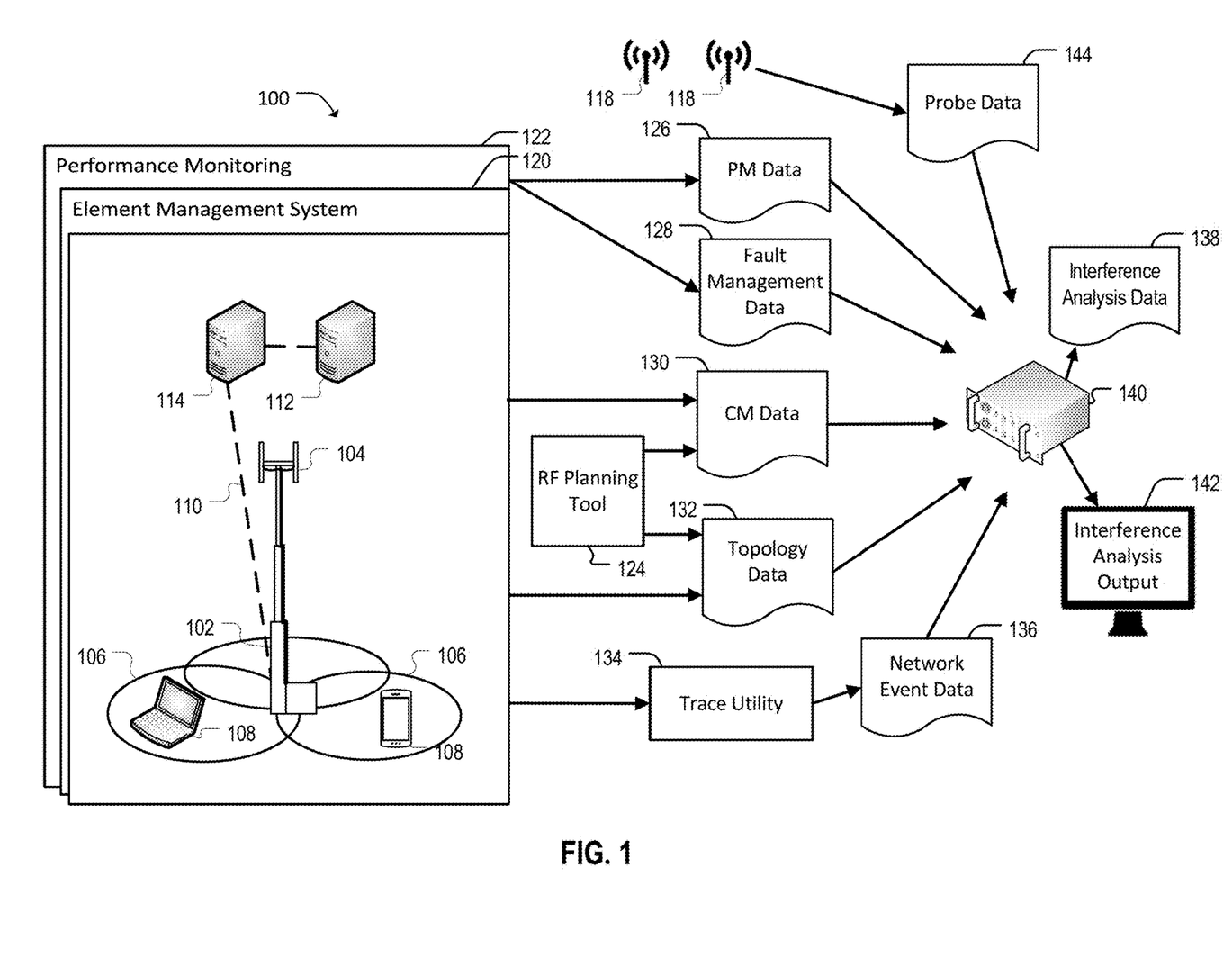
FIG. 1 illustrates a system for analyzing interference in a cellular communications network according to an embodiment.

FIG. 1 illustrates a networked analysis system 100 according to an embodiment. The system 100 integrates information from available wireless network sources to detect, isolate, characterize and classify undesired radio frequency interference in the context of a wireless network. Sources of this information, which are hardware elements of a wireless network, are available in typical wireless cellular networks, but they are not conventionally connected and configured in the manner suggested by this disclosure. In particular, the analytics server 140 may include novel features for a telecommunications network.

A radio access portion of system 100 may include one or more base stations 102, each of which are equipped with one or more antennas 104. Each of the antennas 104 provides wireless communication for user equipment (UE) 108 in one or more cells 106. As used herein, the term "base station" refers to a wireless communications station that serves as a hub of a wireless network. For example, in a Long Term Evolution (LTE) cellular network, a base station may be an eNodeB.

The base stations 102 may provide service for macrocells, microcells, picocells, or femtocells 106. FIG. 1 shows an embodiment in which base station 102 provides wireless communication services to three cells 106. The cells may be specific to a particular Radio Access Technology (RAT) such as Global System for Mobile communications (GSM), Universal Mobile Telecommunications System (UMTS), Long Term Evolution (LTE), New Radio (NR), etc.

Due to the directionality of some RF antennas 104, each base station 102 may serve a plurality of cells 106 arrayed about the base station site. In a typical deployment, a base station 102 provides three to six cells 106, which are deployed in a sectorized fashion at a site. In other embodiments, one or more base stations 102 may be outfitted with an omnidirectional antenna that provides service to a single cell for a given Radio Access Technology (RAT).

Multiple base stations 102 may be present at a site and each base station may support one or more cellular communications technologies (e.g., a base station may support UMTS and LTE cells). The one or more UE 108 may include cell phone devices, laptop computers, handheld gaming units, electronic book devices and tablet PCs, and any other type of portable or fixed wireless computing device that are provided with wireless communications services by a base station 102.

The system 100 may include a backhaul portion 110 that can facilitate distributed network communications between core elements 112 and 114 and one or more base station 102 within a cellular network. In an embodiment, the backhaul portion of the network includes intermediate links between a backbone of the network which may be wire line, and sub-networks or base stations 102 located at the periphery of the network. The network connection between any of the base stations 102 and the rest of the world may initiate with a link to the backhaul portion of a provider's communications network. A backhaul portion 110 may include an X2 connection through which base stations 102 communicate with one another directly.

The core network devices 112 and 114 may each be any of a plurality of network equipment such as a Radio Resource Manager (RRM), a Mobility Management Entity (MME), a serving gateway (S-GW), a Radio Network Controller (RNC), a base station controller (BSC), a mobile switching center (MSC), a Self-Organizing Network (SON) server, an Evolved Serving Mobile Location Server (eS-MLC), a Home Subscriber Server (HSS), etc. The particular core network devices 112 and 114 used may depend on the particular RAT or set of RATs that are present in the network. The core network devices 112 and 114 support a radio access portion of the network that includes the base stations 102.

Elements of the communications network 100 are part of an Element Management System (EMS) 120 and a Performance Monitoring (PM) system 122. The PM system 122 may include base stations 102 and other core network equipment that collect and process performance data and performance metrics for the network. An analytics server 140 interfaces with various network components, including components of the PM system 122 and the EMS 120.

Although FIG. 1 shows the analytics server 140 as a single, discrete component, embodiments are not so limited. For example, in embodiments, components of the analytics server 140 may be distributed among multiple computing entities. In addition, hardware for the analytics server 140 may perform processes not directly related to interference.

The PM system 122 generates performance data 126 for the wireless network. The PM data 126 may be derived from observations of network performance, which may be reported at a predetermined time interval, e.g., every minute, every 5 minutes, every 15 minutes, hourly or daily. PM data 126 may include raw event counts (e.g., counts of dropped calls or handover failures during the observation period) or complex derived performance indicators (e.g., noise rise normalized by user loading, Channel Quality Indicator (CQI) distribution statistics normalized by data volume, etc.). PM data 126 may include raw or aggregated performance data.

In some embodiments, PM data 126 includes data input from a dedicated PM tool, as well as data received directly from EMS 120, or from elements of the Operations and Support System (OSS). In an embodiment, PM data 126 may be derived directly from network event data by the analytics server 140. For example, in an embodiment, when event data 136 is available to the analytics server 140, the server may aggregate individual events to create equivalent PM counters and Key Performance Indicators (KPIs). Thus, in some embodiments, PM data 126 is derived from sources other than a PM system 122.

Fault Management Data 128 may be transmitted from the PM system 122 to analytics server 140. Fault Management Data 128 includes, for example, alarm data that indicates performance issues at one or more cell site.

Configuration Management (CM) data 130 is input to the analytics server 140 from EMS 120. CM data 130 includes the current configuration of various wireless network equipment, such as the configuration of base stations 102 and of core components such as Radio Network Controllers.

CM Data 130 is quasi-static and typically only changes as a result of deploying new network equipment, network optimization such as cell splitting, cell ID reassignment, changes in operating frequency or transmit power, etc. CM data 130 may include pertinent information such as cell technology (e.g., 2G GSM, 3G UMTS, 4G LTE, 5G NR) associated with physical and logical network elements, operating frequency, transmit power, reuse codes, type of cell (e.g., macro, micro, picocell), and other information related to the configuration of the radio network elements.

Topology data 132 is data relating to the location and orientation of network elements, including information such as the antenna latitude and longitude of a base station 102, antenna height, pointing angle for sectorized antennas, antenna beamwidth, site deployment type (e.g., indoor, outdoor, distributed antenna system, etc.), etc. In addition to being used in interference detection and characterization, topology data 132 may be used to aid in correlating PM data 126 and network event data 136 against actual physical locations, and for understanding physical distance and orientation relationships between network elements.

RF planning tool 124 has network planning information used to determine cell site positions and pertinent parameters such as sector pointing angles. Network parameters established via automated or manual network planning processes may be used to configure the actual network equipment and serve as source information for some of the CM data 130 and topology data 132. Alternative embodiments may include a direct data connection between entities that perform RF planning functions and the analytics server 140, provided that the network CM data 130 and topology data 132 is available to support processes described in this disclosure.

Network event data 136 represents discrete network events that are typically logged by network elements. Network event data 136 may include information pertaining to the start and termination of phone calls, information regarding handover of UEs 108 between network cells 106, measurement reports sent by UEs to network elements, as well as periodic reporting at intervals of as low as several seconds or less between reporting periods. Network event data 136 may be available via a continuous streaming mechanism, or recorded and stored in files at network elements that contain, for example, fifteen to thirty minutes or more of network event data. Because event data 136 is typically timestamped with sub-second resolution, it can be used to determine variance of conditions over time at relatively short intervals, such as five minutes, one minute, 30 seconds, or as low as the reporting interval, which may be less than one second.

Network event data 136 may include call event data, or cell trace data according to LTE terminology. Call trace data includes information identifying makes and models of UEs 108, and is typically used by operators to determine device-specific network faults, e.g. that a particular cell phone model has an unusual rate of handover failures under certain conditions. Examples of call event data 136 include tracking area messages, request for retries, Received Signal Strength Indicator (RSSI) measurements, and protocol messages. Network event data 136 is not conventionally used for interference detection, characterization or localization.

Tools supporting the collection of network event 136 data may be configured to collect selected event types, or to subsample the messaging to a subset of active users. Smaller size network event files are useful in measuring implied loading on network data transport such as wireless base station backhaul. When properly configured, network events provide high resolution and near real-time information regarding the operation of targeted network base stations 102, which can be used by processes described in this disclosure.

The collection point for network event data 136 varies between specific wireless technologies and may vary in vendor-specific implementations. For instance, network event data 136 is typically collected at the RNC entity in 3GPP defined 3G networks (i.e., UMTS, High-Speed Packet Access (HSPA)), but network event data 136 is collected by the eNodeB entity in 4G LTE systems. Network event recordings may be pulled directly from the network elements that store the events by the analytics server 140, or automatically stored on a separate data storage server, or staging server, such that external systems such as the analytics server 140 may access network event data 136 without incurring additional data loading on the network elements. Accordingly, it should be understood that network event data 136 may be collected, stored and retrieved in various ways in different embodiments.

The network event data 136 may be collected by a trace utility 134 that is integrated with a cellular network. Illustrative trace concepts and requirements are explained in the Third Generation Partnership Project (3GPP) Technical Specification TS 32.421.

An embodiment may use the network event data 136. In such an embodiment, analysis may derive base station performance indicators directly from network event data 136 in conjunction with, or in place of inputs from a Performance Monitoring system 122. In such an embodiment, network event data records may be aggregated.

Embodiments of this disclosure may utilize additional information sources beyond the sources illustrated in FIG. 1, such as information provided by SON (Self Organizing Network) tools, including analysis and insight into neighbor relationships not readily apparent from the sources listed above. Additional external integrations may also include radio frequency propagation planning tools that may be used to enhance accuracy of interference detection and interference localization.

Also shown in FIG. 1 is a plurality of energy sensing probes 118, which may be dedicated to the task of sensing energy in particular frequencies and reporting energy detection results. Energy sensing probes 118 may be installed at various locations in a network, and may be tuned to detect energy on one or more frequencies that are used for wireless communications. Although embodiments of this disclosure do not require the deployment of dedicated energy sensing probes 118, their use is not precluded.

In an embodiment that uses dedicated energy detection probes 118, energy measurements derived directly from the detection probes are used in conjunction with or in place of energy measurements derived from network event data 136 as inputs to the analytics server 140. Subsequently, the measurements from dedicated energy detection probes 118 may be correlated with known probe positions and probe configuration characteristics (e.g. directional antennas) as well as current network loading data to enhance the detection and characterization of undesired radio frequency interference.

Probe data may in some cases be broadband and cover wider spectrum segments than the operational wireless network, and as such may be used to monitor bands adjacent to or even highly separated from current wireless bands. Such broadband spectrum analytics sensing may be used to support frequency agile spectrum sharing solutions whereby internal band metrics, e.g. network event data correlated with topology and CM data, as well as probe supported broad band metrics, enhance the performance of spectrum analytics.

The analytics server 140 represents a specific processing device that interfaces with one or more of the external data sources described above. The analytics server 140 may perform one or more of anomaly and interference detection, analysis, comparison, characterization and classification processes described in this disclosure. In an embodiment, the analytics server 140 is physically located in an operator's Network Operations Center (NOC). From a logical perspective, the analytics server 140 is located in the Operations Support System (OSS) plane. The analytics server 140 may perform one or more of the specific processes described below. As a result, the analytics server 140 may produce interference analysis data 138 that may, for example, be provided to an automated interference remediation system, and may present interference analysis output 142 to a user.

Figure 2:
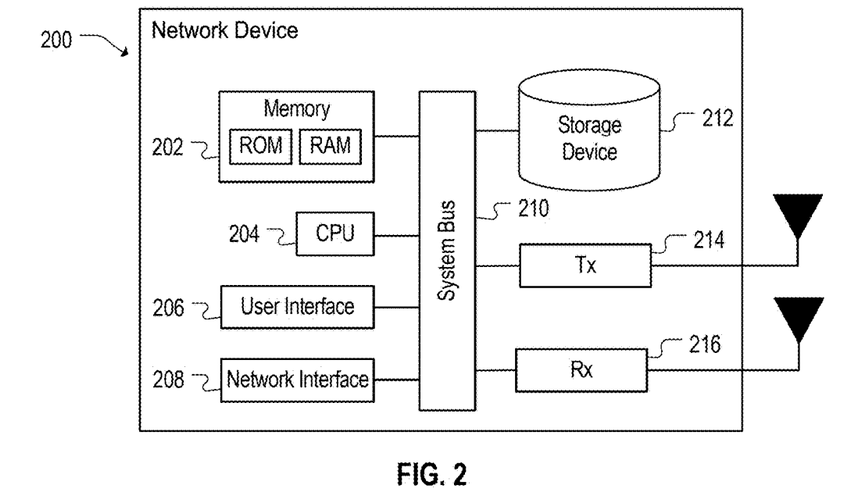
FIG. 2 illustrates a network device according to an embodiment.

FIG. 2 illustrates a block diagram of a network device 200 that may correspond to a UE 108, network controller devices 110, 112 and 114, an analytics server 140, etc. The network device 200 has one or more processor devices including a CPU 204. The CPU 204 may perform processes including the processes disclosed herein by executing computer programs stored in memories 212, a storage device 212, or combinations thereof. In some embodiments, processes disclosed herein may be performed using specialized logic hardware (not shown) such as an Application-Specific Integrated Circuit (ASIC) or Field Programmable Gate Array (FPGA), either alone or in conjunction with the CPU 204.

The memories 212 may include volatile (i.e., RAM) and nonvolatile (i.e., ROM, Flash) memories. The storage device 212 may include, for example, a hard disk drive (HDD), a solid-state drive (SSD), a removable media such as an optical disc loaded into an appropriate optical disk drive, or the like, or combinations thereof. The storage device 212 and memory 202 are each non-transitory computer readable media that may have computer executable instructions stored thereon which, when executed by the appropriate hardware (such as CPU 204), cause the network device 200 to perform one or more operations according to embodiments of the present disclosure.

The network device 200 may also include a user interface 206 that allows a user to interact with software and hardware resources of the network device 200 and to display the performance and operation of the system 100. In addition, the network device 200 may include a network interface 206 for communicating with external devices, and a system bus 210 that facilitates data communications between the hardware resources of the network device 200. If the Network device 200 has wireless connectivity, it may have a transmitter 214 and a receiver 216, which may operate in conjunction with one or more antennas on one or more frequencies.

Wireless network nodes in telecommunication networks make periodic measurements of RF interference, which measurements can be used to adapt network parameters in order to optimize performance in the presence of interference. The interference may be characterized and classified in order to implement appropriate optimization processes.

Most RF interference signals have distinct frequency-domain and time-domain characteristics. For example, PIM (Passive Inter-modulation) interference shows strongest interference power at the center frequency of the intermodulation product. Cable TV egress interference shows the cable TV channels and gaps in the frequency domain. RAN interference such as co-channel interference shows strongest interference power levels during times (e.g., daytime) when the mobile communication traffic is at its peak. Interference that arises in bi-directional amplifiers (BDA) usually presents as a narrowband interference signal which drifts in the frequency domain.

Figure 3:
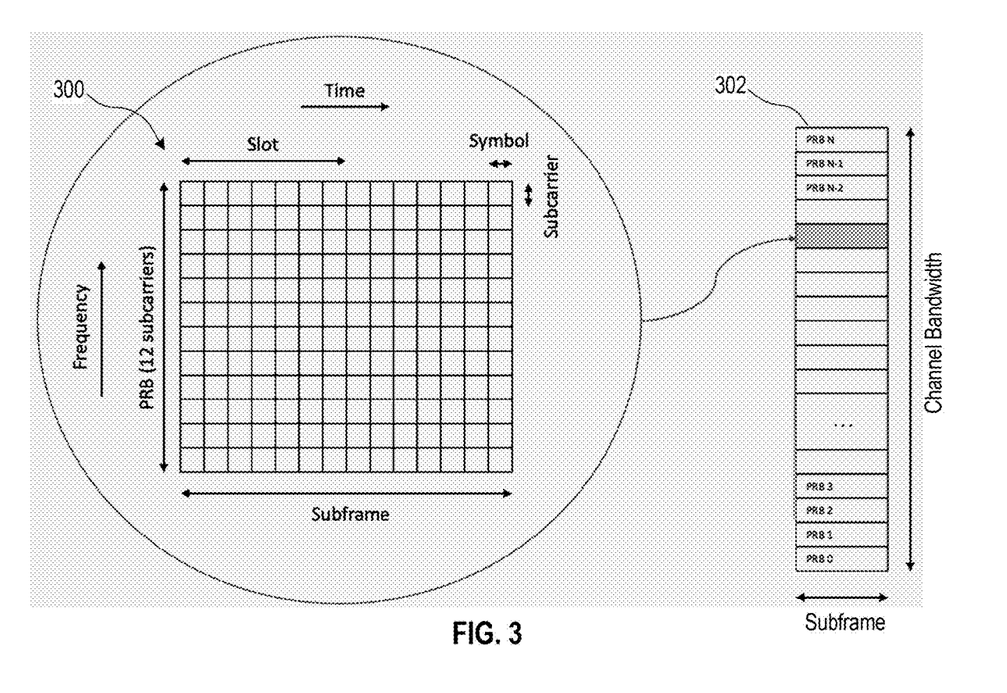
FIG. 3 illustrates a Physical Resource Block (PRB) of a transmission in a Radio Access Network (RAN) that an embodiment may monitor to detect interference.

FIG. 3 illustrates a Physical Resource Block (PRB) of a Radio Access Network (RAN) that may incorporate an embodiment. In a 4G LTE or 5G NR RAN, one PRB consists of 12 OFDM subcarriers over one subframe (1 ms). When radio resources are scheduled to mobile devices the RAN, PRBs correspond to the basic allocation units for the scheduling.

The bandwidth occupied by one PRB depends on the OFDM subcarrier spacing used by the cell in which the PRB is being used. The subcarrier spacing for LTE is always 15 kHz, resulting in a PRB bandwidth of 12×15 kHz=180 kHz. 5G NR cells may have subcarrier spacings of 15 kHz, 30 kHz, 60 kHz, 120 kHz, or 240 kHz corresponding to PRB bandwidths of 180 kHz, 360 kHz, 720 kHz, 1440 kHz, or 2880 kHz, respectively.

Each LTE or NR cell node can measure respective interference levels for each PRB and calculate average interference level for each PRB over a Reporting Output Period (ROP), such as 15 minutes, 30 minutes, or 1 hour. After calculating the average interference level per PRB for each ROP, each cell node may report the calculated values to an Operations, Administration and Management (OAM) system, such as may be included in a networked analysis system 100 of FIG. 1.

Therefore, the per-PRB interference data at the OAM system can present frequency-time characteristics of interference and therefore can be used by embodiments to classify various interference source types. Different types of interference may typically present with different frequency-time patterns in the per-PRB interference data; for example, RAN interference may be strongest during times of peak wireless network usage, PIM interference may be present at all times but only in some frequencies, cable TV egress interference may be present at all times but only at a plurality of frequencies corresponding to cable TV channels, and so on. By recognizing such time-frequency patterns in per-PRB interference data, a trained machine learning model may recognize the type(s) of source(s) of interference present in the per-PRB interference data.

The reported per-PRB interference data may be average power levels in dBm units, or it may be counter values which may correspond to dBm units. Once interference values are transformed in dBm units, they may then be normalized to be used as inputs to a neural network corresponding to a machine learning (ML) model. An illustrative scaling maps the dBm values in the range [−120, −80] to the range [0, 1] using the transform function scaled value=(dbm_value+ 120)/40. Per-PRB data values lower than −120 dBm or greater than −80 dBm may be clipped to 0 or 1 respectively, or they may be scaled to values outside the range [0, 1] using the same transform function.

Figure 4:
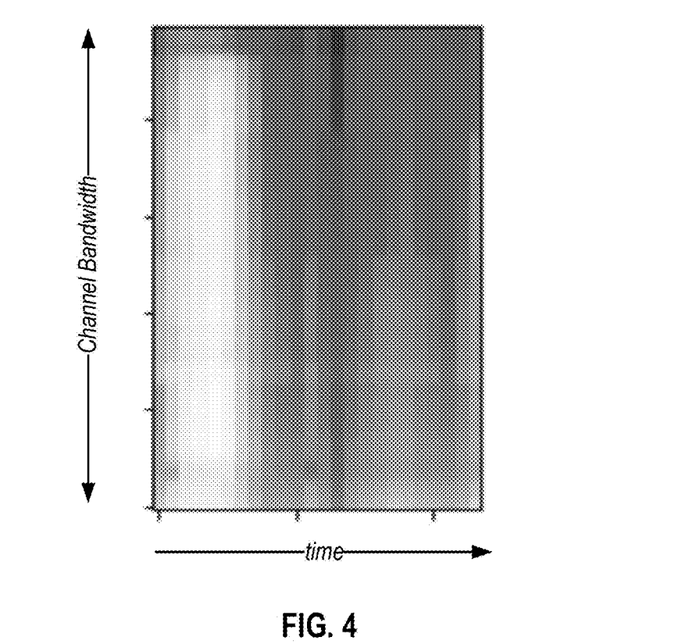
FIG. 4 illustrates a 2-dimensional (2D) interference color map by PRB and time in accordance with an embodiment.

When the per-PRB interference data over a 24-hour period (or another predetermined period) is organized into a form that may be presented as a 2-D colormap, the frequency-time characteristics of the interference can be seen, as shown in FIG. 4. The colormap may be a grayscale colormap wherein all the colors are shades of grade.

In FIG. 4, the vertical axis indicates frequencies of PRBs in the channel, and the horizontal axis indicates a time in the 24-hour time period. The interference intensity for a particular PRB during a particular ROP is shown by shading of the location at Y and X coordinates respectively corresponding to the PRB frequency and the ROP time, with the darker shades indicating higher interference levels.

After transforming the collected per-PRB interference data over a predetermined period (such as 24 hours, one week, or the like) into a colormap data structure corresponding to the colormap of FIG. 4, the colormap data structure may be labeled as including interference from a particular interference source type (such as External, RAN, PIM, and so on, or combinations thereof). In embodiments, the colormap data structure may be labeled as including interference from a plurality of particular interference source types; for example, the colormap data structure may be labeled as including both RAN and PIM interference. The labeling may then be confirmed in the field by verifying the presence of the interference source type(s) corresponding to the label(s).

When the interference source type corresponding to a colormap is not known, the colormap data structure may be labeled "Unknown Source Type". If several of the colormaps do not have a known corresponding interference type, but have interference patterns that are similar to each other, this may indicate that the interference source type is the same for all the colormaps. Colormap data structures having respective colormaps that do not have a known corresponding interference type but that are similar to each other may then be given the same label, such as "Unknown Interference—Type 1" for a first group of colormap data structures having respective colormaps that are similar to each other, "Unknown Interference—Type 2" for a second group of colormap data structures having respective colormaps that are similar to each other, etc. Once the interference source type has been determined, the labels may be changed to reflect the interference type.

The labeled colormap data structures may be used to create a corpus of training data. Increasing the amount of per-PRB interference data transformed into labeled colormap data structures and added to the training corpus generally increases the accuracy of the ML model that is trained using the training corpus, especially when the labeling of the labeled colormap data structures is confirmed in the field.

The training corpus may include an extremely large amount of data. For example, a ML model embodiment of this disclosure has been trained with a training corpus comprised of over 3 million hours of per-PRB interference data and associated metadata collected in the field from actual RANs. The data collected in the field exhibited large amounts of variability, demonstrating that the manual creation of models of real-world interference is difficult if not impossible. However, the ML model trained using the above-described training corpus demonstrated reliable classification of types of interference sources present in real-world per-PRB interference data and associated metadata.

The ML model may be neural network. In particular, the ML model may be a deep neural network having an input layer, an output layer, and one or more hidden layers coupled between the input and output layers. The layers may be a combination of convolutional layers, and/or dense layers. In an embodiment, the ML model may include 200,000 or more nodes.

The training of the ML model using the training corpus may be performed off-line. The model may be re-trained as more data is labeled.

Because some interference signatures for a same interference source can differ depending on the vendor of the system receiving the interference, the network in which the system is deployed, the operating frequency of the network, and so on, when a colormap data structure including per-PRB interference data is labeled, additional metadata related to the collection of the per-PRB interference data (such as an equipment vendor, RAN operator, channel bandwidth, channel frequency of the channel including the PRBs, RAT (Radio Access Technology), cell types (macro, micro, pico, femto, etc) and so on) can be stored together with the colormap data structure.

Unless otherwise noted, the term "per-PRB interference data" in the following text corresponds to per-PRB interference data organized to indicate interference levels for each of a plurality of PRBs in a channel at each of plurality of times. The times may correspond to intervals during a period of time, where the period of time may be a day, a week, or some other period. In some cases, the per-PRB interference data may include interference data from a single such period of time. In other cases, interference data from a plurality of the period of time may be aggregated together to form a single instance of per-PRB interference data; for example, each value in the per-PRB interference data may respectively indicate an average of the interference present of a respective PRB at a particular time of day averaged over a week, averaged over five consecutive weekdays, averaged over two consecutive weekend days, or averaged on a per-day-of-the-week basis over several weeks, but embodiments are not limited thereto. The colormap data structure illustrated in the figures is an example of how the per-PRB interference data may be organized, but embodiments are not limited thereto.

Figure 5:
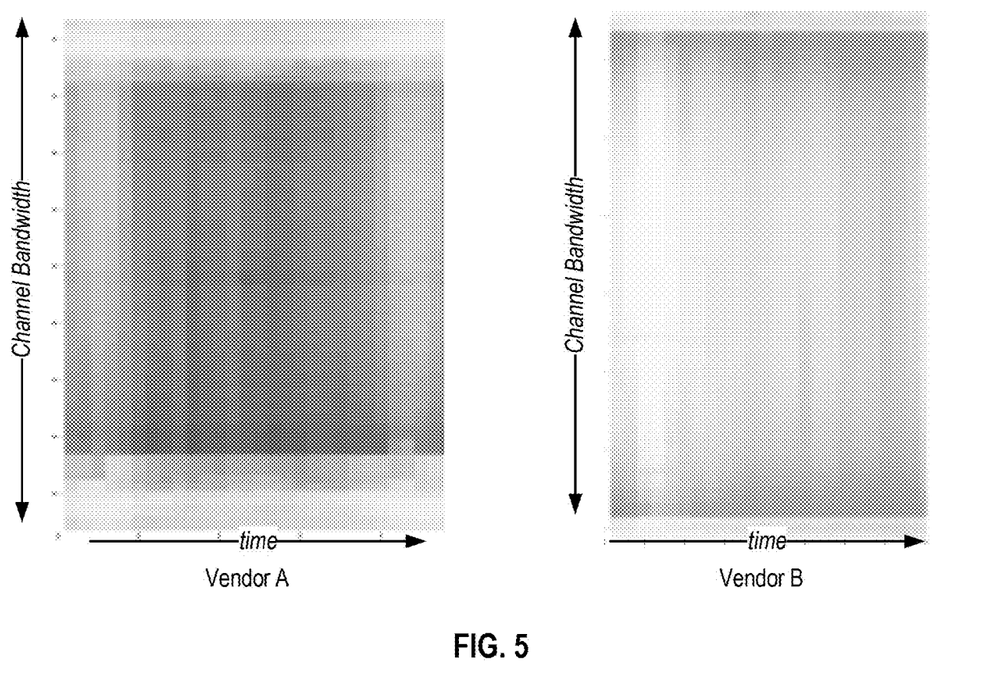
FIG. 5 includes 2D interference color maps illustrating how equipment vendor for a RAN may affect interference measurement in an embodiment.

FIG. 5 shows examples of RAN interference measurements for two different vendors. While the interference type is the same for each vendor, the levels of interference in the frequency domain can be quite different. Also, some interference types such as Cable TV or DECT (Digital Enhanced Cordless Telecommunication) interference can be observed in certain frequencies only, and therefore may or may not be present depending on which band a cell is operating in.

The ML model is trained to recognize various interference types such as, RAN, PIM, External, DECT, CATV, and so on. Also, metadata is used in training the ML model so that interference signatures specific to a vendor, channel bandwidth, channel frequency, operator, or combinations thereof may be recognized. In embodiments, preprocessing steps may be performed to the per-PRB interference data before providing the per-PRB interference data to the ML model.

Figure 6:
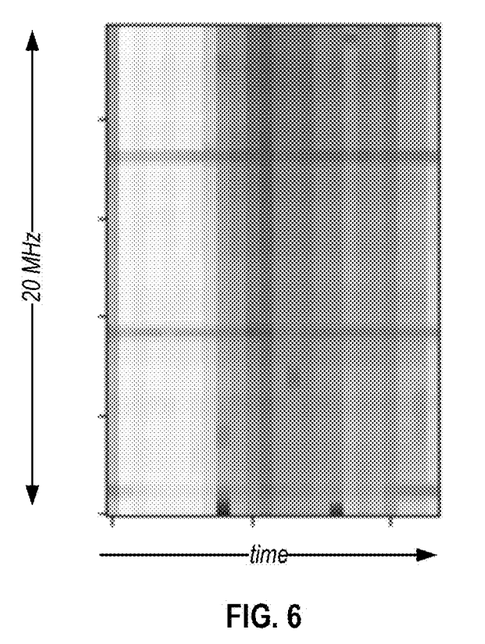
FIG. 6 illustrates a 2D interference color map for a channel having a baseline bandwidth according to an embodiment.
Figure 7:
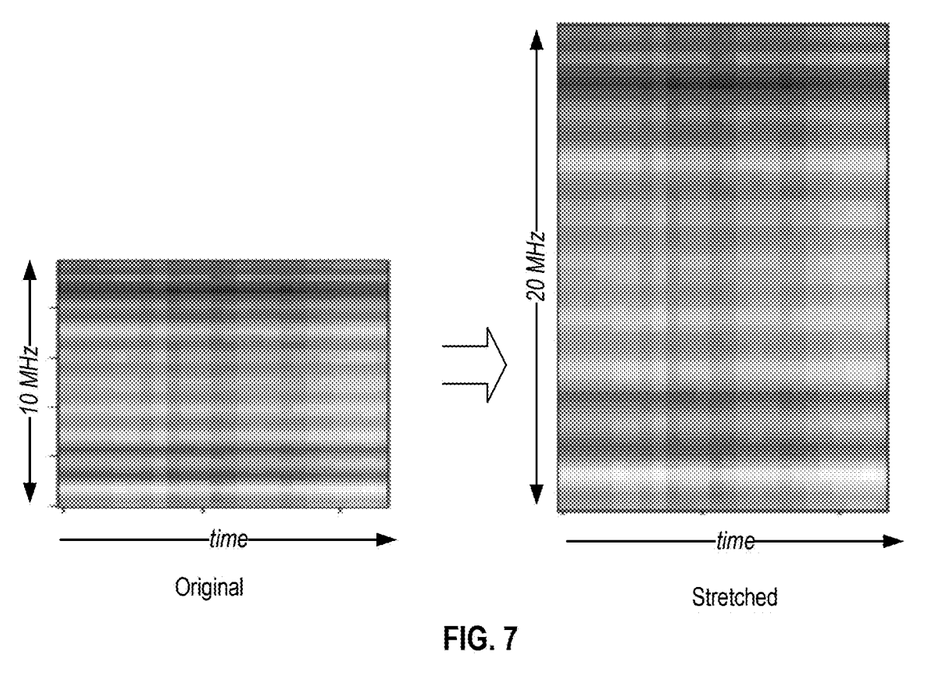
FIG. 7 illustrates preprocessing of a 2D interference color map for a channel having a bandwidth less than the baseline bandwidth according to an embodiment.
Figure 8:
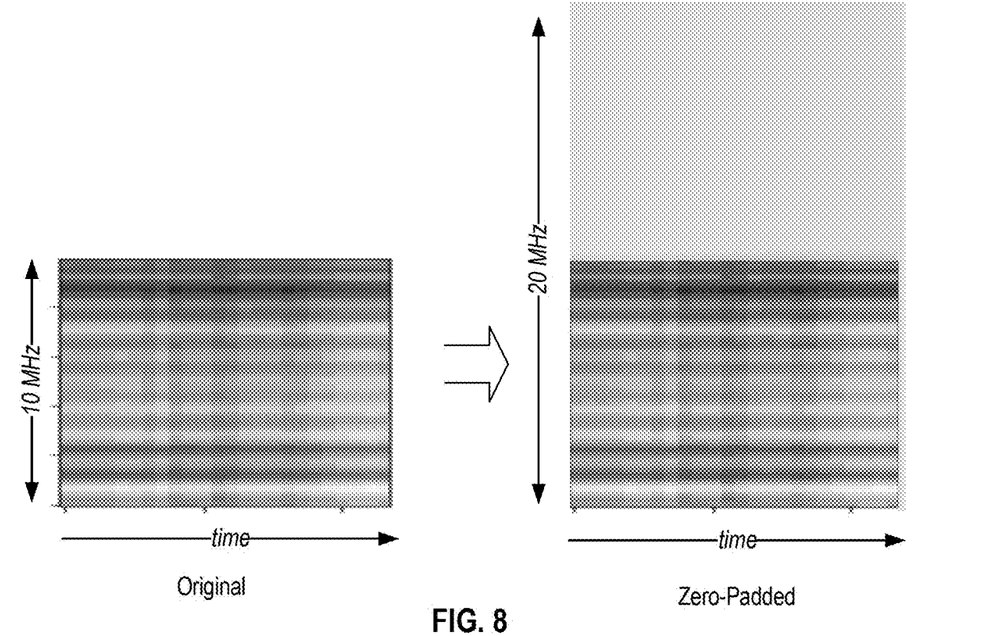
FIG. 8 illustrates preprocessing of a 2D interference color map for a channel having a bandwidth less than the baseline bandwidth according to another embodiment.

For example, different cells may have different numbers of PRBs per subframe, according to a bandwidth of each cell; 5 MHz LTE cells have 25 PRBs per subframe but 20 MHz LTE cells have 100 PRBs per subframe. In order to train the ML model with per-PRB interference data from cells having different bandwidths, embodiments may perform one of two different resizing preprocessing processes so that all the per-PRB interference data can be presented to the ML data as same sized data. FIGS. 6, 7, and 8 illustrate these preprocessing processes.

FIG. 6 illustrates per-PRB interference data from a cell having the baseline bandwidth according to an embodiment. In the example of FIGS. 6-8, the baseline bandwidth is 20 MHz, but embodiments are not limited thereto. The per-PRB interference data shown in FIG. 6 may be presented to the ML model without being resized.

FIG. 7 illustrates an embodiment wherein per-PRB interference data from cells having bandwidths smaller than a baseline bandwidth (typically, the largest bandwidth of any cell providing per-PRB interference data to the embodiment) are "stretched" to the PRB data size of the baseline bandwidth by copying each PRB data a number of times equal to the ratio of the baseline bandwidth to the bandwidth of the cell, and the stretched per-PRB interference data may be presented to the ML model.

In the example of FIG. 7 where the original data has a 10 MHz bandwidth, each data element of the original per-PRB interference data is duplicated once to create the stretched per-PRB interference data. As a result, data at location (X,Y) in the original per-PRB interference data may correspond to data at location (X, 2Y) and location (X, 2Y+1) in the stretched per-PRB interference data.

FIG. 8 illustrates another embodiment wherein the per-PRB interference data from cells having bandwidths smaller than the baseline bandwidth may be padded with zero values so that it is the same size as the per-PRB interference data from cells having the baseline bandwidth, and the zero-padded per-PRB interference data may be presented to the ML model.

In the example of FIG. 8 where the original data has a 10 MHz bandwidth, data at location (X,Y) in the original per-PRB interference data may correspond to data at location (X, Y) in the zero-padded per-PRB interference data, and data at locations in the zero-padded per-PRB interference data that do not have corresponding locations in the original per-PRB interference data are set to zero.

Additional preprocessing of the PRB data may be done to improve the contrast for cases of low-level interference, which can help improve the prediction performance of the trained ML model.

Figure 9:
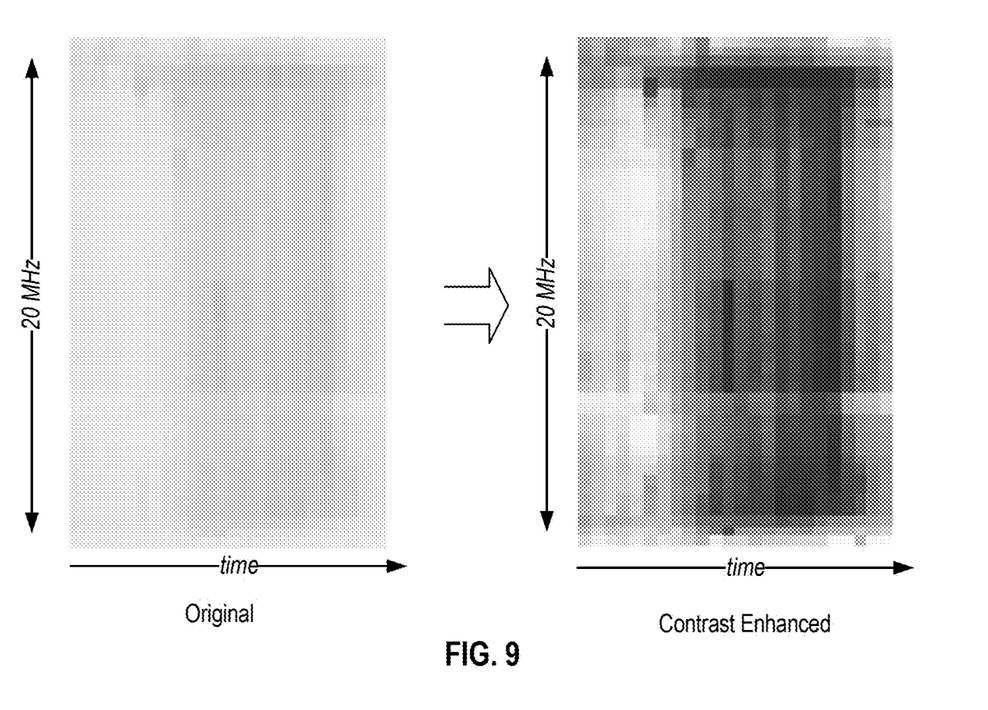
FIG. 9 illustrates contrast enhancement preprocessing of a 2D interference color map according to an embodiment.

FIG. 9 illustrates an example contrast enhancement of per-PRB interference data. The original PRB data is not showing the clear signature but after contrast enhancement its interference signature becomes clearer, which may enable the ML model to better recognize the types of the source(s) of the interference. Contrast enhancement may be linear or non-linear, and may in embodiments be performed using algorithms known in the related arts.

Other data (such as metadata) may be input to the ML model along with the per-PRB interference data, including frequency, channel bandwidth, RAN vendor, and so on. This other data may be encoded as either a continuous variable that has been normalized, or as one-hot encoded data, as appropriate. For example, the frequency of a band used by a cell may be encoded as a continuous value or as a one-hot encoded indicator of the 3GPP frequency band of the cell.

RF interference analysis may be comprised of various analysis processes such as anomaly detection, interference characterization, interference classification, interference aggregation and interference resolution. Furthermore, RF interference analysis using machine learning (ML) may include a training process for the ML model and an analysis process that used the ML model. The training process may be performed off-line and/or off-site. The analysis process may be performed on-line and in real-time by network monitoring resources, such as the analysis server 140 of FIG. 1.

Figure 10:
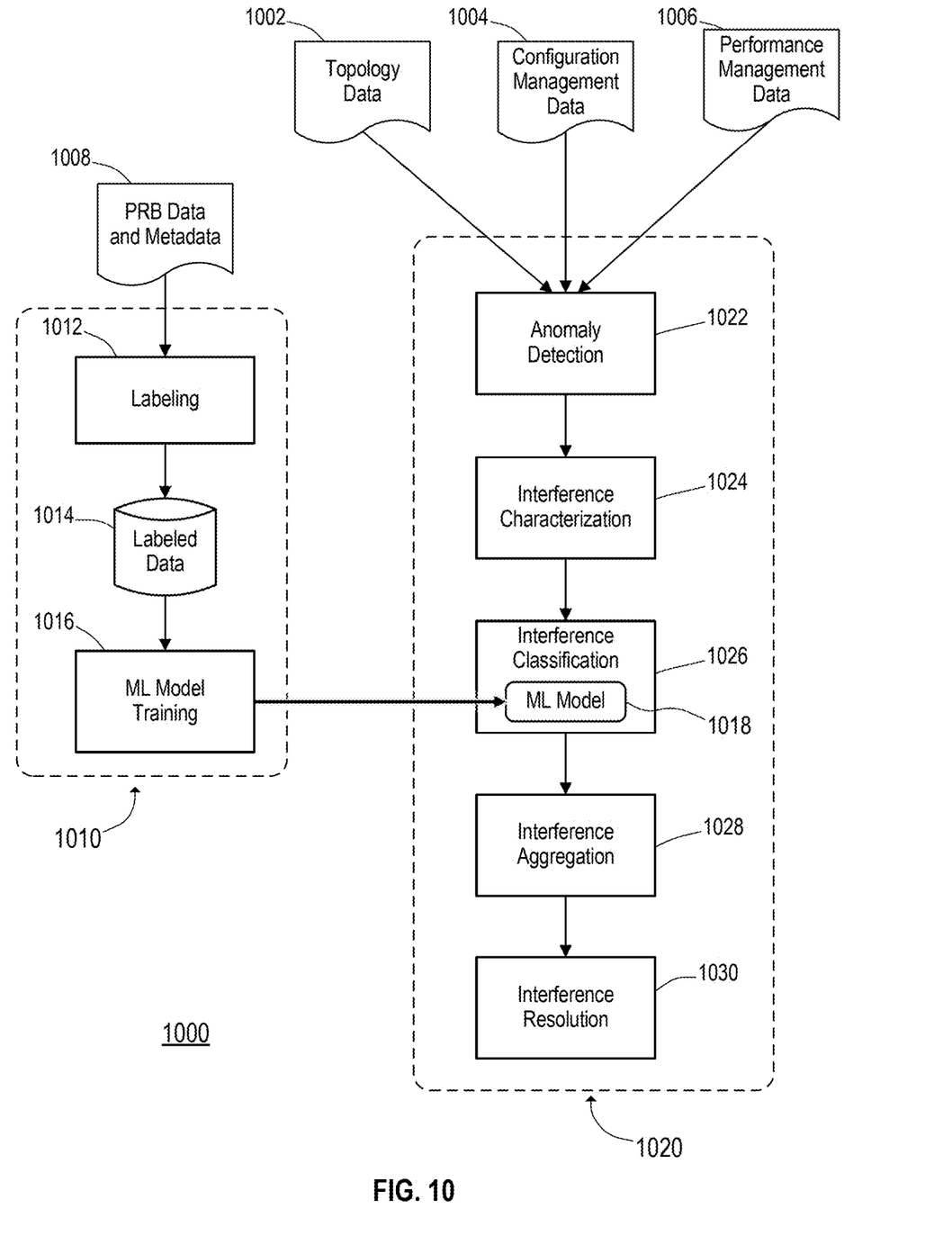
FIG. 10 illustrates a process for detecting and classifying interference using machine learning according to an embodiment.

FIG. 10 illustrates a ML-based process 1000 for detecting and classifying RF interference using OAM data according to an embodiment. The process 1000 includes an ML model training process 1010 and an ML-based analysis process 1020. The ML model training process 1010 produces an ML model 1018 that is used in the analysis process 1020.

In the ML model training process 1010, a labelling process 1012 labels a plurality of per-PRB interference data collected in the field and respective metadata (collectively referred to as PRB data and metadata 1008) to indicate what type(s) of interference are indicated in each of the per-PRB interference data, creating a training corpus 1014 of labeled data. The labelling process 1012 may be a manual process, and may include post-hoc verification in the field of the labeling of at least a subset of the labeled per-PRB interference data.

The training corpus 1014 is provided to a model training process 1016 that uses the training corpus 1014 to produce the ML model 1018. The model training process 1016 may use any of the ML model training techniques known in the related arts. Details of operation of an embodiment of the model training process 1016 are presented in FIG. 11 and the accompanying text, below.

When new PRB data and metadata 1008 are added to the training corpus 1014, the model training process 1016 may use the updated training corpus 1014 to produce an updated ML model 1018.

In an embodiment, a user of the ML-based process 1000 may provide additional labeled per-PRB interference data and associated metadata to augment the training corpus 1014. The additional labeled per-PRB interference data and associated metadata may be from the network which is using the analysis process 1020 to classify interference sources. A retrained ML model 1018 may then be produced by model training process 1016 using the augmented training corpus 1014, and the retrained ML model 1018 may replace the previous trained ML model 1018 in the analysis process 1020.

Although not shown in FIG. 10, the PRB data and metadata 1008 may be derived, in whole or in part, from OAM data such as topology data 1002, Configuration Management (CM) data 1004, Performance Management (PM) data 1006, event data (such as the event data 136 of FIG. 1), data from probes (such as the probes 118 of FIG. 1), or combinations thereof.

The topology data 1002, CM data 1004, and PM data 1006 comprise the main input data for the analysis process 1020. Topology data 1002 may include, but is not limited to, coordinates of cells, antenna direction (azimuth), vertical and horizontal antenna beamwidth, antenna height, mechanical tilt, electrical tilt, cell radio to antenna connectivity information, and the like. CM data 1004 may include radio configuration parameters used at each cell, such as downlink and uplink operating frequency, channel bandwidth, etc. PM data 1006 may include interference measurements, performance related counters, and KPI (Key Performance Indicator) data collected at each cell.

In an embodiment, an anomaly detection process 1022 uses the topology data, CM data, PM data, or combinations thereof to identify cells exhibiting anomalous behaviors (referred to hereinafter as anomalous cells). Examples of anomalous behavior include high interference levels, degraded performance levels, or combinations thereof, which may be determined relative to nominal levels.

Once anomalous cells are detected, an interference characterization process 1024 determines whether the interference is network interference from a source internal to the network or external interference from a source external to the network (such as unlicensed or malfunctioning transmitters, industrial operations, sparking transformers, etc.). Various techniques can be applied for differentiating network interference from external interference as known in the related arts, such as correlating interference measurement and measuring interference during coordinated interference times as described in U.S. Pat. No. 9,572,055.

The interference characterization process 1024 may further assess the anomalous cells to determine if there are any surrounding cells that exhibit behaviors that are highly correlated with the behaviors of the anomalous cells, or that exhibit specific behaviors indicative of specific interference source types.

An interference classification process 1026 classifies interference using a trained ML model 1018 provided by the ML model training process 1010. Inputs to the interference classification process 1026 include unlabeled PRB interference data and associated metadata, which may be derived from the topology data 1002, CM data 1004, and PM data 1006.

An output of the interference classification process 1026 include one or more interference source type indications for each anomalous cell. An interference source type indication may include an indicator of the type of interference source (such as PIM, Narrowband, RAN, Cable TV, and so on) causing interference in the corresponding cell and a value indicating a confidence level for the determination that interference received by the corresponding cell was caused by the indicated type of interference source. Details of operation of an embodiment of the interference classification process 1026 are presented in FIG. 12 and the accompanying text, below.

In an embodiment, the interference classification process 1026 may classify interference on a cell-by-cell basis based on the OAM data for each cell. In another embodiment, the interference classification process 1026 may classify interference based on collective characteristics at the anomalous cells. For example, an interference source type for an anomalous cell may be classified as 'External' if the anomalous cell has a specific interference signature over a certain period of time and the same signature is observed at its co-site cells and some of its surrounding cells over the same period of time.

Once respective interference source type(s) are determined for the anomalous cells, an interference aggregation process 1028 performs further analysis to determine for each anomalous cell whether there are other cells that are being subjected to interference by the same interference source. For each anomalous cell, its interference signature over a period of time is compared to the interference data of its co-site cells and surrounding cells to find cells that are being subjected to interference by the same interference source. The comparison process comprises correlations of interference data over the same period of time and correlations of interference data over the channel bandwidth in the frequency domain.

An output of the interference aggregation process 1028 includes one or more interference event indications indicating a group of cells affected by a same interference source. An interference event indication may further indicate a type of the interference source, and may include a confidence level for the assessment.

An interference resolution process 1030 may use the interference event indications to determine proper resolutions for each interference event based on the type of the interference source. For example:

When the interference is unlicensed external interference, a location of the interference source may be determined based on topology data 1002 and PM data 1006 (e.g., as described in the US patent 10,605,890), and the located interference source may be turned off or remediated. Interference from cable TV or from Digital Enhanced Cordless Telecommunication (DECT) may be resolved using the same approach.

When the interference is PIM interference, the root cause of the PIM interference may be determined by further investigation and then fixed. Root causes of PIM interference include rusty or loose connectors, ferromagnetic material in front of antennas, faulty antenna, and so on.

When the interference is RAN interference, the root cause the root cause of the RAN interference is determined by further investigation and fixed. Root causes of RAN interference include cell coverage overlaps, poorly configured handover parameters, incorrect neighbor relation tables, and so on.

As shown above, classifying the interference using the ML model to identify the type of the source of the interference narrows down the search for a root cause of the interference, saving money and time during the process of eliminating or remediating the interference.

Figure 11:
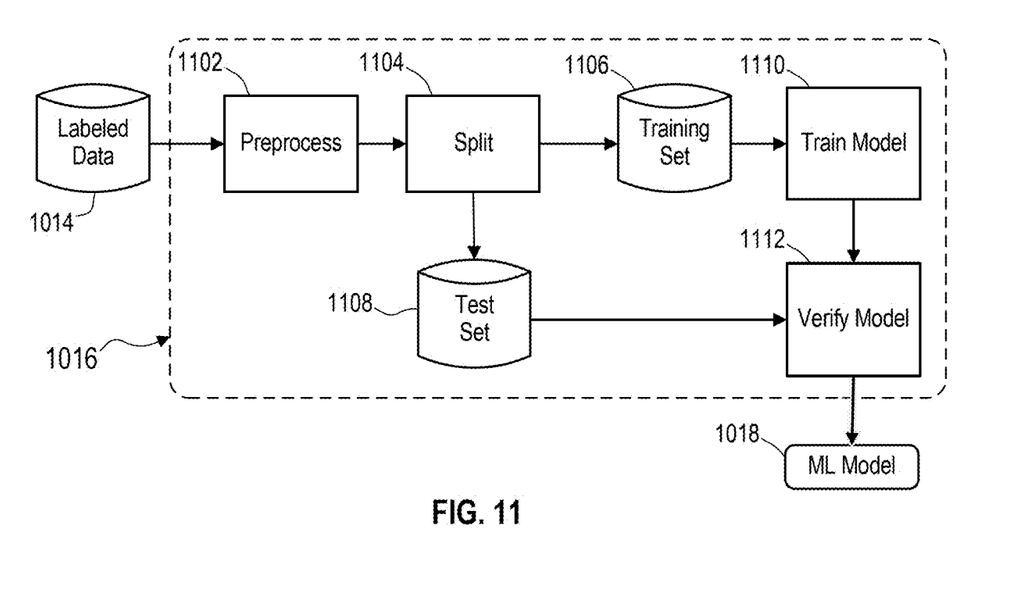
FIG. 11 illustrates a model training process according to an embodiment.

FIG. 11 illustrates a non-limiting embodiment of the model training process 1016 of FIG. 10. The model training process 1016 receives input comprising a training corpus 1014 including a plurality of labeled per-PRB interference data and associated metadata, and produces a trained ML model 1018 in accordance with the training corpus 1014 as an output.

A preprocessing process 1102 preprocesses the training corpus 1014. Preprocessing the training corpus may include normalizing the per-PRB interference data, stretching or zero-padding any per-PRB interference data from a cell having a bandwidth less than a baseline bandwidth, contrast enhancement of the per-PRB interference data, or combinations thereof.

A splitting process 1104 splits the preprocessed training corpus 1014 into a training set 1106 and a test set 1108, each comprising a plurality of preprocessed labeled per-PRB interference data and associated metadata. The splitting process 1104 may determine which preprocessed labeled per-PRB interference data and associated metadata goes into each of the training set 1106 and a test set 1108 based on a random- or pseudo-random number generator. In an embodiment, approximately 85% of the preprocessed training corpus 1014 may be incorporated into the training set 1106 and the rest incorporated into the test set 1108, but embodiments are not limited thereto.

A training process 1110 uses the training set 1106 to train a machine learning (ML) model 1018. The training process 1110 may use any of the ML model training techniques known in the related arts.

A model verifying process 1112 uses the test set 1108 to verify the ML model 1018 produces by the training process 1110. The model verifying process 1112 inputs preprocessed per-PRB interference data and associated metadata (without corresponding label(s)) from the test set 1108 into the ML model 1018 and compares the resulting output to the labels associated with the inputs in the test set 1108.

When the model verifying process 1112 determines that the ML model 1018 has produced few enough results that differ from the corresponding labels in the test set 1108, the model training process 1016 provides the trained ML model 1018 for use, such as for use in the analysis process 1020 of FIG. 10.

Figure 12:
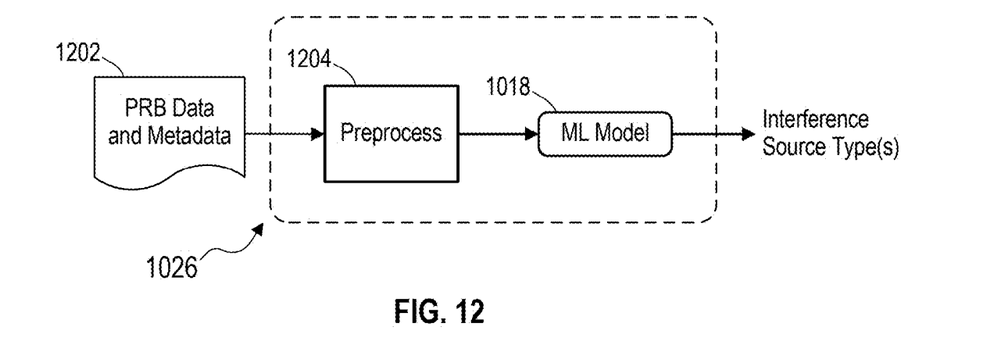
FIG. 12 illustrates an interference classification process according to an embodiment.

FIG. 12 illustrates a non-limiting embodiment of the interference classification process 1026 of FIG. 10. The interference classification process 1026 receives unlabeled per-PRB interference data and metadata 1202 as inputs, and produces one or more interference source type indications corresponding to the received PRB interference data and metadata 1202 using an ML model 1018 such as may be produced by the model training process 1016 illustrated in FIGS. 10 and 11.

The unlabeled per-PRB interference data and metadata 1202 may be derived from OAM data such as the topology data 1002, CM data 1004, and PM data 1006 of FIG. 10, as described above.

A preprocessing process 1102 preprocesses the unlabeled per-PRB interference data and metadata 1202. Preprocessing the training corpus can include normalizing the per-PRB interference data, stretching or zero-padding any per-PRB interference data from a cell having a bandwidth less than a baseline bandwidth, contrast enhancement of the per-PRB interference data, or combinations thereof.

The preprocessed unlabeled per-PRB interference data and metadata 1202 is provided as inputs to the trained ML model 1018. The trained ML model 1018 then outputs one or more interference source type indications. Each interference source type indication may include an indication of an interference source type and a corresponding confidence level indicating a degree of certainty that the interference source type is generating the interference present in the unlabeled per-PRB interference data and metadata 1202.

In an embodiment, interference source types having confidence values below a predetermined threshold are not included in the one or more interference source type indications output by the interference classification process 1026.

In another embodiment, the interference classification process 1026 outputs the N interference source types having the highest confidence values in the one or more interference source type indications, where N is a predetermined value greater than or equal to 1.

An operator, who may be an operator may be a licensor of RF spectrum that operates a cellular telecommunications network, can use information from embodiments of this disclosure to deploy personnel to remedy the physical cause of interference, such as shutting down a rogue transmitter or repairing a sparking transformer. Some interference types may be resolved by changing network CM parameters. For example, TDD self-interference during times of tropospheric ducting may be resolved by increasing a guard time configuration parameter at cells causing the TDD self-interference. Furthermore, embodiments of the present disclosure can classify interference sources by type without requiring network service interruptions, and without installing additional energy sensing equipment in network areas.

Embodiments relate to a method that detects and classifies interference source type using network management data without having to measure and collect additional interference data using separate measurement devices. By analyzing network management data, such as CM (Configuration Management), PM (Performance Management) and Topology data, using a trained ML model, an embodiment identifies sources of interference and classifies them by type. Embodiments may identify the types of a plurality of simultaneously-occurring interference sources have respectively different types.

What is claimed is:

1. A method for determining a type of a source of interference received in a wireless telecommunications network, the method comprising:
   receiving Operations, Administration, and Management (OAM) data of the wireless telecommunications network;
   producing, using the OAM data, first per-Physical Resource Block (per-PRB) interference data for a cell of the wireless telecommunications network, the first per-PRB interference data including interference data for each of a plurality of PRBs of the cell for each of a plurality of intervals within a period of time; and
   producing, using a trained machine learning (ML) model and based on the first per-PRB interference data, one or more interference source type indications,
   wherein producing the one or more interference source type indications includes:
      preprocessing the first per-PRB interference data to produce preprocessed data;
      when a bandwidth of the first per-PRB interference data is less than a baseline bandwidth, stretching or zero-padding the first per-PRB interference data to produce the preprocessed data having the baseline bandwidth;
      inputting the preprocessed data to the ML model; and
      producing the one or more interference source type indications using an output of the ML model.

2. The method of claim 1, wherein each of the one or more interference source type indications includes an indication of a type of an interference source and a corresponding confidence level indicating a level of certainty that interference in the first per-PRB interference data was caused by that type of interference source.

3. The method of claim 1, wherein the first per-PRB interference data further includes metadata corresponding to equipment of the cell, metadata corresponding to an operating configuration of the cell, or both.

4. The method of claim 3,
   wherein the metadata corresponding to the equipment of the cell includes an indicator of a vendor of the equipment, an operator of the cell, or both, and
   wherein the metadata corresponding to an operating configuration of the cell includes an indicator of a channel frequency of the cell, a channel bandwidth of the cell, or both.

5. The method of claim 1, wherein preprocessing the first per-PRB interference data includes:
   performing contrast enhancement on the first per-PRB interference data to produce the preprocessed data.

6. The method of claim 1, wherein the OAM data includes topology data, configuration management data, and performance management data.

7. The method of claim 1, wherein the method further comprises:
   producing the trained ML model by training an ML model using a training corpus, the training corpus including a plurality of training records, each training record including second per-PRB interference data and one or more labels.

8. The method of claim 7, wherein producing the trained ML model includes:
   splitting the training corpus into a first training set of training records and a first test set of training records;
   training the ML model using the first set of training records;
   verifying the ML model using the test set of training records; and
   when verifying the ML model using the test set of training records fails:
   splitting the training corpus into a second training set of training records and a second test set of training records;
   training the ML model using the second set of training records; and
   verifying the ML model using the second test set of training records.

9. A non-transient computer-readable medium (CRM) including computer programming product which, when executed by a user device, cause the user device to perform steps comprising:
   receiving Operations, Administration, and Management (OAM) data of the wireless telecommunications network;
   producing, using the OAM data, first per-Physical Resource Block (per-PRB) interference data for a cell of the wireless telecommunications network, the first per-PRB interference data including interference data for each of a plurality of PRBs of the cell for each of a plurality of intervals within a period of time; and
   producing, using a trained machine learning (ML) model and based on the first per-PRB interference data, one or more interference source type indications,
      wherein producing the one or more interference source type indications includes:
      preprocessing the first per-PRB interference data to produce preprocessed data;
      inputting the preprocessed data to the ML model; and
      producing the one or more interference source type indications using an output of the ML model, and
   when a bandwidth of the first per-PRB interference data is less than a baseline bandwidth, stretching or zero-padding the first per-PRB interference data to produce the preprocessed data having the baseline bandwidth.

10. The CRM of claim 9, wherein each of the one or more interference source type indications includes an indication of a type of an interference source and a corresponding confidence level indicating a level of certainty that interference in the first per-PRB interference data was caused by that type of interference source.

11. The CRM of claim 9, wherein the first per-PRB interference data further includes metadata corresponding to equipment of the cell, metadata corresponding to an operating configuration of the cell, or both.

12. The CRM of claim 11,
   wherein the metadata corresponding to the equipment of the cell includes an indicator of a vendor of the equipment, an operator of the cell, or both, and
   wherein the metadata corresponding to an operating configuration of the cell includes an indicator of a channel frequency of the cell, a channel bandwidth of the cell, or both.

13. The CRM of claim 9, wherein preprocessing the first per-PRB interference data includes:
   performing contrast enhancement on the first per-PRB interference data to produce the preprocessed data.

14. The CRM of claim 9, wherein the OAM data includes topology data, configuration management data, and performance management data.

15. The CRM of claim 9, wherein the method further comprises:
   producing the trained ML model by training an ML model using a training corpus, the training corpus including a plurality of training records, each training record including second per-PRB interference data and one or more labels.

16. The CRM of claim 15, wherein producing the trained ML model includes:
   splitting the training corpus into a first training set of training records and a first test set of training records;
   training the ML model using the first set of training records;
   verifying the ML model using the test set of training records; and
   when verifying the ML model using the test set of training records fails:
   splitting the training corpus into a second training set of training records and a second test set of training records;
   training the ML model using the second set of training records; and
   verifying the ML model using the second test set of training records.

17. A method for determining a type of a source of interference received in a wireless telecommunications network, the method comprising:
   receiving Operations, Administration, and Management (OAM) data of the wireless telecommunications network;
   producing, using the OAM data, first per-Physical Resource Block (per-PRB) interference data for a cell of the wireless telecommunications network, the first per-PRB interference data including interference data for each of a plurality of PRBs of the cell for each of a plurality of intervals within a period of time; and
   producing, using a trained machine learning (ML) model and based on the first per-PRB interference data, one or more interference source type indications, wherein producing the one or more interference source type indications includes:
   preprocessing the first per-PRB interference data to produce preprocessed data;
   inputting the preprocessed data to the ML model; and
   producing the one or more interference source type indications using an output of the ML model,
   wherein preprocessing the first per-PRB interference data includes performing contrast enhancement on the first per-PRB interference data to produce the preprocessed data.

18. A non-transient computer-readable medium (CRM) including computer programming product which, when executed by a user device, cause the user device to perform steps comprising:

receiving Operations, Administration, and Management (OAM) data of the wireless telecommunications network;

producing, using the OAM data, first per-Physical Resource Block (per-PRB) interference data for a cell of the wireless telecommunications network, the first per-PRB interference data including interference data for each of a plurality of PRBs of the cell for each of a plurality of intervals within a period of time; and producing, using a trained machine learning (ML) model and based on the first per-PRB interference data, one or more interference source type indications, wherein producing the one or more interference source type indications includes:

preprocessing the first per-PRB interference data to produce preprocessed data;

inputting the preprocessed data to the ML model; and producing the one or more interference source type indications using an output of the ML model, wherein preprocessing the first per-PRB interference data includes performing contrast enhancement on the first per-PRB interference data to produce the preprocessed data.

* * * * *